US009085935B2

(12) United States Patent
Wang Chen

(10) Patent No.: US 9,085,935 B2
(45) Date of Patent: Jul. 21, 2015

(54) MOLDED DOOR SKIN CAPABLY PROVIDED FOR A REPLACEABLE PANEL REMOVABLY INSTALLED THEREON

(75) Inventor: Kuei Yung Wang Chen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 688 days.

(21) Appl. No.: 13/303,263

(22) Filed: Nov. 23, 2011

(65) Prior Publication Data

US 2013/0129967 A1 May 23, 2013

(51) Int. Cl.

*B32B 3/26* (2006.01)
*E06B 7/00* (2006.01)
*E06B 3/70* (2006.01)

(52) U.S. Cl.

CPC ....... *E06B 3/7001* (2013.01); *Y10T 428/24008* (2015.01); *Y10T 428/24488* (2015.01); *Y10T 428/24612* (2015.01); *Y10T 428/24628* (2015.01); *Y10T 428/24736* (2015.01)

(58) Field of Classification Search

CPC ............... Y10T 428/24008; Y10T 428/24488; Y10T 428/24612; Y10T 428/24628; Y10T 428/24736; E06B 3/7001

USPC .............. 428/172, 174; 52/311.2, 311.3, 313, 52/316, 455–458, 784.11

See application file for complete search history.

(56) References Cited

U.S. PATENT DOCUMENTS

| | | | | |
|---|---|---|---|---|
| 11,227 | A * | 7/1854 | Ingalls | 49/463 |
| 3,979,869 | A * | 9/1976 | Beehler | 52/514 |
| 4,702,054 | A * | 10/1987 | Turner | 52/455 |
| 4,834,429 | A * | 5/1989 | Miller | 285/347 |
| 4,965,030 | A * | 10/1990 | Thorn | 264/46.5 |
| 5,067,278 | A * | 11/1991 | Lyons | 49/463 |
| 5,653,061 | A * | 8/1997 | Hiner | 49/463 |
| 2007/0022691 | A1* | 2/2007 | Geller | 52/514 |
| 2008/0028701 | A1* | 2/2008 | White | 52/207 |
| 2008/0100080 | A1* | 5/2008 | Hyndman | 296/37.6 |
| 2008/0164634 | A1* | 7/2008 | Hodges et al. | 264/255 |

* cited by examiner

*Primary Examiner* — Donald J Loney
(74) *Attorney, Agent, or Firm* — Bacon & Thomas, PLLC

(57) ABSTRACT

An improved molded door skin of a synthetic door is disclosed to have a recessed portion for removably installing a replaceable panel thereon, by changing the replaceable panel with another one having different patterns, the molded door skin is therefore variegated; the molded door skin further has a receiving groove circling the recessed portion for receiving a batten having decorative effects, by combinations of different battens with different fashionable replaceable panels can better improve the molded door skin in decoration and esthetics.

3 Claims, 4 Drawing Sheets

MOLDED DOOR SKIN CAPABLY PROVIDED FOR A REPLACEABLE PANEL REMOVABLY INSTALLED THEREON

BACKGROUND

1. Field of the Invention

The present invention relates to molded door skins, and more particularly, to a molded door skin capably provided for a replaceable panel removably installed thereon.

2. Description of Prior Art

A conventional molded door skin for a synthetic door is molded through SMC (Sheet Molding Compound) process as a unity with a thickness about only 1 to 4 mm.

For the purpose of adding such a molded skin with artistry and stylishness, one or more panels providing decorative effects are typically formed on the surface of the molded door skin during said SMC process. However, due to the thickness being limited those panels formed on the molded door skin are mostly featured as depressed patterns having the highest altitude the same as the level of the surface encircled the panels. Since such a molded door skin of a synthetic door is so lack of embossment and less stereoscopic, the conventional molded synthetic door nevertheless comes short of decoration and esthetics.

In addition, the panels on the conventional molded door skin are integrally formed and are therefore non-replaceable, which fact substantially limits the molded door skin capably designed in variety of decoration.

SUMMARY OF THE INVENTION

In view of this, the present invention provides a molded door skin containing a replaceable panel for a synthetic door. The molded door skin is molded through SMC process as a door-like shape having a thickness ranging between 1 and 4 mm.

The molded door skin containing a recessed portion is configured to serve as either a front door skin or a back door skin of a synthetic door, so that a variety of different styles of replaceable panels with variegated patterns are allowed to be installed on the recessed portion of the molded door skin for diversification of the synthetic door. Each replaceable panel may have a fashionable surface deliberately designed with an embossed or undulatory profile to promote a feeling of artistry, stylishness and smartness, so that the molded door skin can give changeable stereoscopic decorative effects in virtue of the replacement of the replaceable panels.

The recessed portion of the molded door skin is made by forming a sink depressed from the surface of the molded door skin, and the recessed portion may have a square, rectangular, circular, elliptical, semicircular, heart-shaped or rhomboidal contour.

The molded door skin further has a receiving groove circling the recessed portion for receiving one or more battens of decorative effects. Thus, combinations of different battens with different fashionable replaceable panels can better add the molded door skin with artistry and stylishness.

The batten has a fixing portion that is configured to be inserted into and engaged with the receiving groove of the molded door skin to position the batten having the decorative effects.

The molded door skin further has a protective spacer deposited between a periphery of the replaceable panel and the batten to protect the periphery of the replaceable panel.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
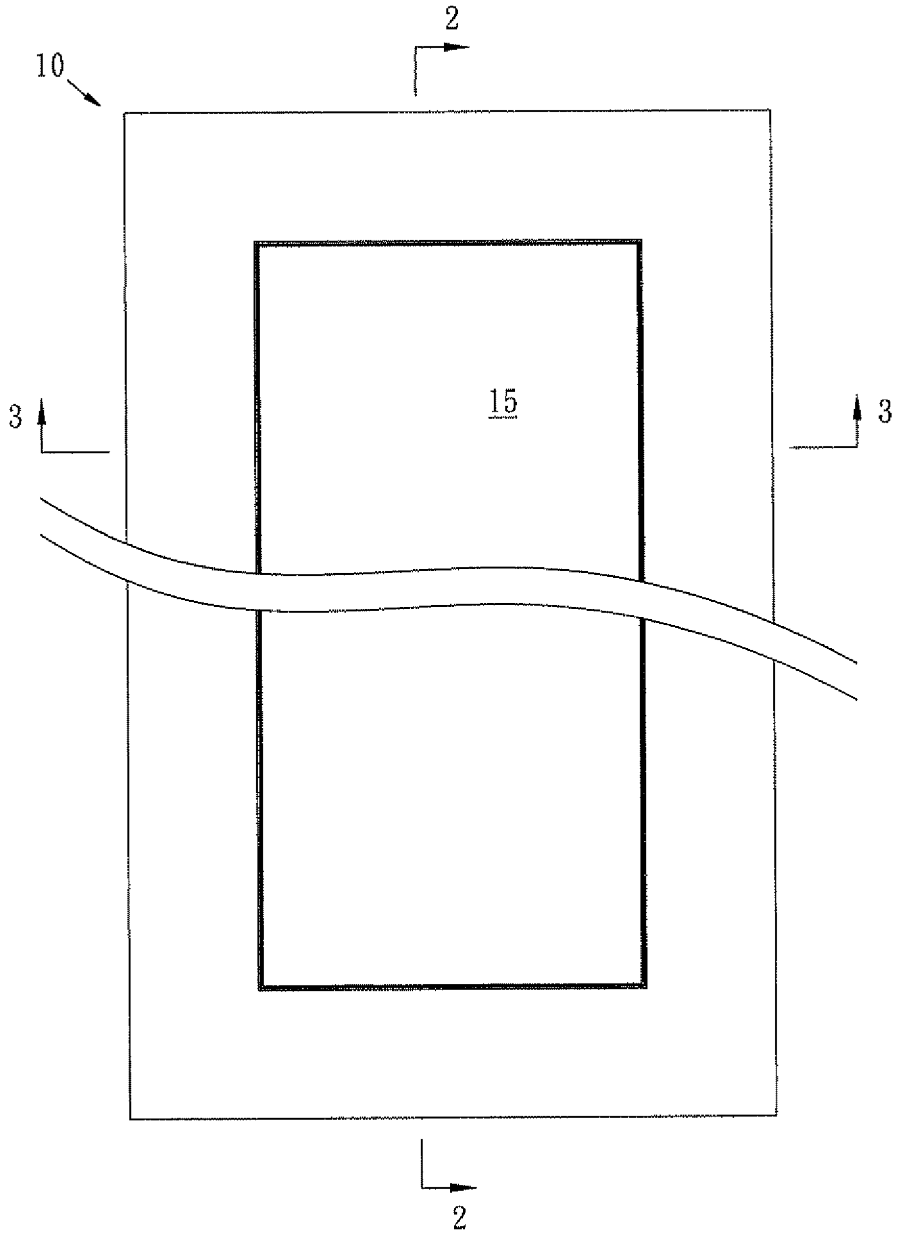
FIG. 1 is a schematic drawing to show a molded door skin of the present invention containing a recessed portion.
Figure 3:
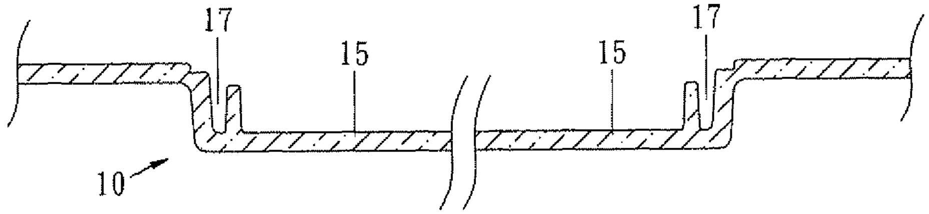
FIG. 3 is another partially enlarged cross-sectional view of the molded door skin taken along lines 3-3 of FIG. 1.
Figure 2:
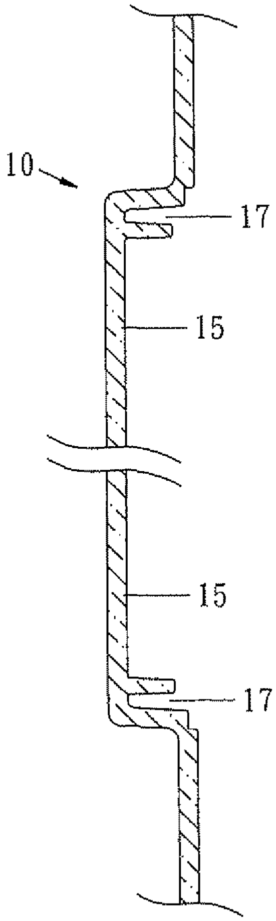
FIG. 2 is a partially enlarged cross-sectional view of the molded door skin taken along lines 2-2 of FIG. 1.

Referring to FIG. 1 through FIG. 3, a molded door skin 10 of the present invention is molded through SMC process as a molded door-like sheet having a thickness ranging between 1 and 4 mm. The molded door skin 10 is configured to serve as either a front door skin or a back door skin of a synthetic door.

The molded door skin 10 has a recessed portion 15, whose lengthwise and widthwise cross-sectional views are shown in FIG. 2 and FIG. 3, respectively. As can be seen, the recessed portion 15 is formed as a sink depressed from the surface of the molded door skin 10.

Figure 4:
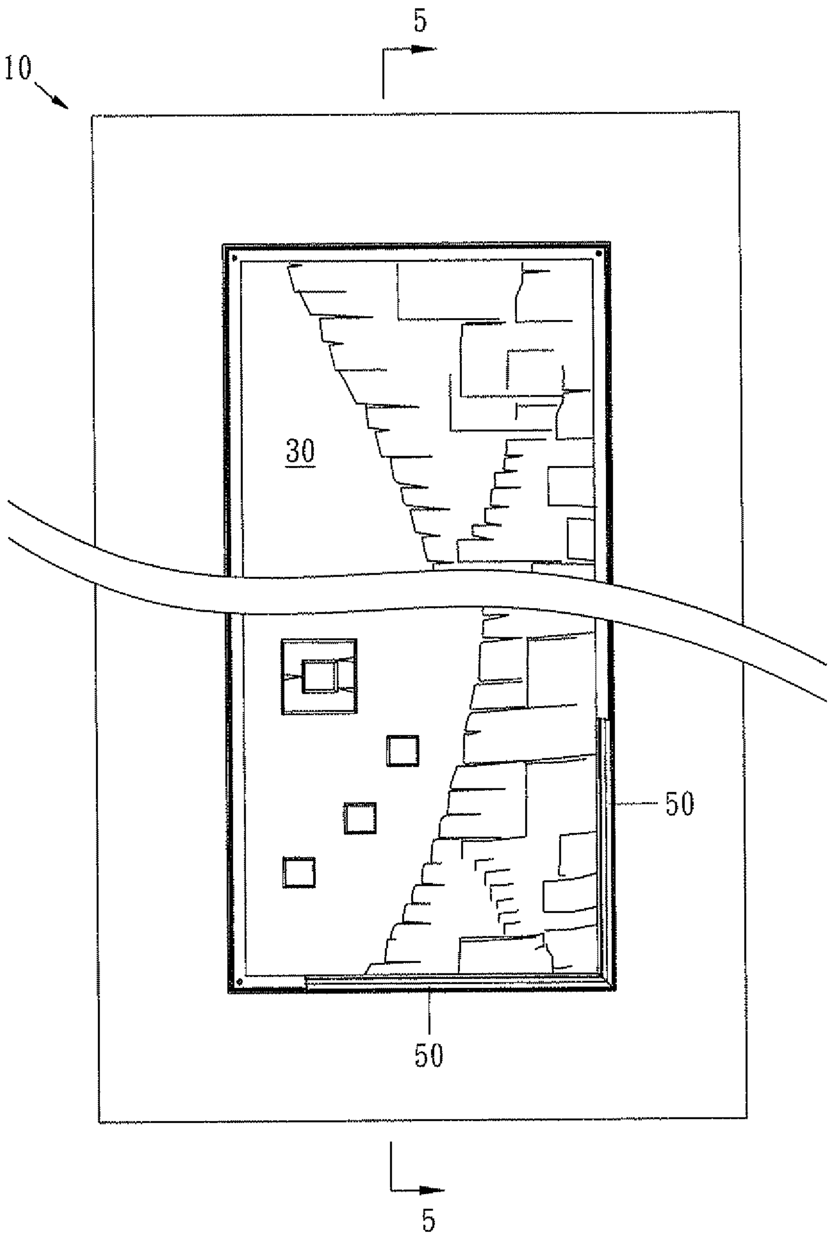
FIG. 4 shows the molded door skin of FIG. 1 installed with a replaceable panel as well as one or more battens.
Figure 5:
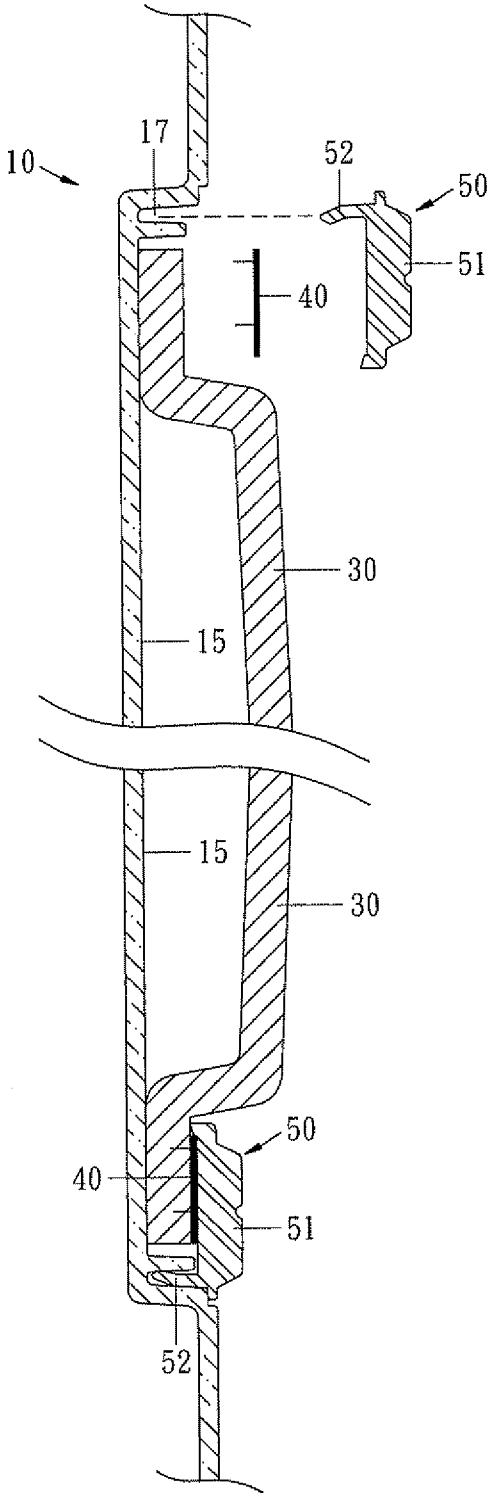
FIG. 5 is a partially enlarged cross-sectional view of the molded door skin with the replaceable panel as well as the battens, taken along lines 5-5 of FIG. 4, wherein one additional batten is to be installed.

Referring to FIG. 4 and FIG. 5, the recessed portion 15 of the molded door skin 10 is configured to receive a replaceable panel 30 removably installed thereon. The molded door skin 10 of the present invention thereby is able to present various visual effects with different replaceable panels 30. In addition, the replaceable panel 30 may have a fashionable surface deliberately designed with an embossed or undulatory profile to endow the molded door skin 10 with stereoscopic decorative effects.

The recessed portion 15 of the molded door skin 10 may be shaped in form of square, rectangular, circular, semicircular, elliptical, heart-shaped or rhomboidal.

Thus, the replaceable panel 30, despite of its pattern, has a contour fitting the contour of the recessed portion 15 of the molded door skin 10, so that the replaceable panel 30 can be removably installed in the recessed portion 15 of the molded door skin 10. Different said replaceable panel 30 may have different colors, different designs and be made of different materials.

For instance, the replaceable panel 30 may be made of fiberglass resin (FRP), glass fiber reinforced gypsum (GRG), glass fiber reinforced cement (GRC), casted aluminum, polyurethane (PU) foam, elastic fiber glass (EFG), glass, sandstone or stainless steel with carven or painted patterns and colors to present a variety of designs.

As shown in FIG. 1 through FIG. 5, in another embodiment of the molded door skin 10 of the present invention, a receiving groove 17 is provided around the recessed portion 15 of the molded door skin 10 for receiving one or more battens 50 that provides decorative effects.

The batten 50 has a main body 51 and a fixing portion 52 for being inserted into the receiving groove 17 of the molded door skin 10. Therefore, after installed with the replaceable panel 30, the molded door skin 10 of the present invention is capable of being further installed with the batten 50 that provides additional decorative effects. The batten 50 thus circling the replaceable panel 30 can thereby add more esthetics to the molded door skin 10 of the present invention.

Moreover, a protective spacer 40 as shown in FIG. 5 may be arranged between a periphery of the replaceable panel 30 and the batten 50 to protect the periphery of the replaceable panel 30.

What is claimed is:

1. An improved molded door skin of a synthetic door comprising:

a molded door sheet molded through Sheet Molding Compound (SMC) process having a flat perimeter of thickness ranging between 1 and 4 mm, a recessed portion containing no aperture and formed as a sink depressed from the surface of the flat perimeter, and a receiving groove circled the recessed portion thereof; and a replaceable panel removably installed in the recessed portion thereof;

wherein the improvement comprises the replaceable panel has a contour fitting the contour of the recessed portion of the molded door sheet and has a surface designed with an embossed or undulatory profile of which height exceeds the flat perimeter of the molded door sheet to make the molded door skin get stereoscopic decorative effects; and one or more battens to provide additional decorative effects are installed to circle the replaceable panel through each batten having a fixing portion inserted into the receiving groove of the molded door sheet.

2. The improved molded door skin of claim 1, wherein the recessed portion has a shaped contour selected from the group consisting of a square, a rectangle, a circle, an ellipse, a semicircle, a heart and a rhomboid.

3. The improved molded door skin of claim 1, wherein a protective spacer is arranged between a periphery of the replaceable panel and the batten.

* * * * *